3,402,055
GLASS COMPOSITION
Ransom S. Harris, Tiffin, and George R. Machlan, Newark, Ohio, assignors to Owens-Corning Fiberglas Corporation, a corporation of Delaware
No Drawing. Continuation-in-part of application Ser. No. 197,575, May 25, 1962. This application July 12, 1965, Ser. No. 471,407
8 Claims. (Cl. 106—50)

ABSTRACT OF THE DISCLOSURE

High-strength, high-temperature resistant glass fibers used as a reinforcement for plastics. Magnesium aluminosilicate glass compositions provide fibers for aerospace and other demanding applications.

---

This application is a continuation-in-part of our copending application Ser. No. 197,575, filed May 25, 1962, now abandoned.

This invention relates to very high strength glass compositions which have other unusual physical properties including ability to withstand high temperatures and particularly to glass compositions which can be readily fiberized. Glass fibers of particular composition which have great strength in tensile and perform well as a reinforcement or an insulating structure at elevated temperatures are a specific subject and part of this invention.

New uses of glass reinforcements include many applications wherein high operating temperatures are encountered. For instance, air and space vehicles, missile and rocket nose sections and casings are subjected to conditions of temperature and environment not formerly encountered. Completely new criteria determine the required properties of matrix and reinforcement alike in reinforced resin space vehicle and rocket components. High-temperature resistance has become an essential and former materials were not adequate.

It is an object of this invention to provide compositions which are fiberizable and also capable of withstanding high temperatures without materially changing composition or form during their useful life.

It is also an object to provide glass fibers having tensile strength in excess of 500,000 p.s.i. and as high as 900,000 p.s.i. without the need for protective layers of metal or the like on the glass fibers.

It is a further object to provide glass fibers which can provide reinforcement of organic or inorganic materials with which they are combined even though subjected to elevated service temperatures of 1500° F. or higher.

It is also an object to provide a high-temperature resistant composition which can be fiberized by a commercial process.

Silica fibers are known to exhibit good resistance to high temperatures. Even though silica fibers have very good physical properties once they are formed, silica is not a material which can be fiberized with ease and at commercially feasible production rates. It has been found that magnesia added to silica provides a steeper viscosity curve to the melt which is recognized as desirable, and that additions of a modifier such as alumina likewise steepens the viscosity curve of the melt while also beneficially lowering the liquids. Silica, alumina and magnesia are combined in the indicated proportions to provide compositions having the necessary viscosity-temperature relationship and miscibility.

EXAMPLE 1

| | Parts by wt. |
|---|---|
| $SiO_2$ | 65.0 |
| $Al_2O_3$ | 25.0 |
| MgO | 10.0 |

Liquidus 2680° F.

This glass composition was melted from batch and fiberized by passing the glass through a plurality of orifices in a tip section of a feeder maintained at a temperature of about 2860° F. to produce 150's textile fibers. The tensile strength of these fibers was from 550,000 to a maximum of 896,000 p.s.i. The fibers can be used at service temperatures of from 1400° to 1500° F.

EXAMPLE 2

| | Parts by wt. |
|---|---|
| $SiO_2$ | 50–85 |
| $Al_2O_3$ | 10–35 |
| MgO | 4–25 |

These compositions provide high-temperature resistant, high strength fibers.

EXAMPLE 3

| | Parts by wt. |
|---|---|
| $SiO_2$ | 55.0 |
| $Al_2O_3$ | 32.0 |
| MgO | 13.0 |

This glass was fiberized to form a high-temperature resistant, high tensile strength product.

EXAMPLE 4

| | Parts by wt. |
|---|---|
| $SiO_2$ | 79.9 |
| $Al_2O_3$ | 12.6 |
| MgO | 8.0 |

Fibers were formed by attenuating molten streams of glass from a feeder maintained at a temperature of about 3300° F.

EXAMPLE 5

| | Parts by wt. |
|---|---|
| $SiO_2$ | 65.0 |
| $Al_2O_3$ | 31.0 |
| MgO | 4.0 |

The feeder was maintained at a temperature of about 3000° F. and strong, high-temperature resistant fibers were produced from the above melt.

EXAMPLE 6

| | Parts by wt. |
|---|---|
| $SiO_2$ | 60.0 |
| $Al_2O_3$ | 20.0 |
| MgO | 20.0 |

The feeder was maintained at about 2685° F. to produce strong, high-temperature resistant fibers.

EXAMPLE 7

| | Parts by wt. |
|---|---|
| $SiO_2$ | 70 |
| $Al_2O_3$ | 25 |
| MgO | 5 |

This glass was fiberized from a feeder maintained at about 2900° F. The tensile strength of these fibers was from 479,000 to 653,000 p.s.i.

All the ingredients listed in the examples are essential and minor proportions of other oxides which are present as impurities can be tolerated but are not essential, nor desirable. The proportions of oxides are critical and variations from the compositions is not recommended if fiberizability and high tensile strength and temperature resistance are to be maintained. The glass fibers are produced from glass compositions formulated to be free of alkali and boron oxide.

It has been found advantageous to melt batch ingredients in an electrically heated melter; the melt is then formed into multiple streams of glass which are attenuated into individual fibers. These fibers are gathered together into a strand which is wound upon a collet winder such as that shown in Beach 2,391,870.

The fibers of Example 1 have been tested extensively. It has been found that fibers of this composition have 40% higher tensile strengths at room temperature and a 200° F. higher temperature capability than conventional fibers. Average tensile strengths of large numbers of samples have been measured. The following table illustrates the retention of strength at elevated temperatures of test samples of fibers.

TENSILE STRENGTHS

| Temperature, °F. | Tensile × 10³ p.s.i. | |
|---|---|---|
| | Max. | Yield |
| 75 | 640 | |
| 600 | 604 | |
| 1,000 | 353 | 275 |
| 1,200 | 246 | 216 |
| 1,400 | 179 | 137 |
| 1,500 | 123 | 85 |
| 1,600 | | |

Although exceptionally high tensile strengths are achieved in the bare fibers, various treatments may be applied to the fibers as they are produced. Conventional roll or pad applicators apply aqueous or organic solvent base treatments to the fibers as they are formed to enhance the temperature resistance and resistance to corrosive attack. Solutions, either aqueous or organic solvent, of metallic salts of chromium, zirconium, titanium, aluminum or others, of various inorganic or organic compounds, of monomers or polymers or mixtures of monomers and polymers of the same or different monomers, or dispersion or emulsions of various film formers, lubricants, or other size ingredients or mixtures of these may be used to treat fibers produced from the compositions of this invention to enhance their inherently excellent physical properties.

Continuous filaments of the glass composition of Example 1 are gathered into a 204 filament strand after they are treated with a size composition. A number of these strands are gathered together into a roving suitable for use as a high strength reinforcement for a plastic structure.

The size composition applied at forming can be an epoxy compatible size, an organo-silane size, a chrome-complex size or any one of the recently developed size compositions which provide mechanical or chemical coupling of the glass surfaces to the resin surfaces. Various organo-silane compounds have been found to improve the physical properties of resin and glass composite products.

These compositions can also be fiberized and then coated with metal. Fibers of Example 1 have been coated with aluminum and alloys of aluminum. Many low melting alloys such as those of aluminum and zinc can be applied to glass fibers to make high strength coated fibers.

Variations may be made within the spirit and scope of the appended claims.

We claim:
1. A high strength reinforcement for a plastic structure comprising a plurality of glass fibers consisting solely of from 55–79.9 percent by weight silica, from 12.6–32 percent alumina, from 4–20 percent magnesia and incidental impurities, said glass fibers having an average tensile strength of at least 500,000 p.s.i.

2. The high strength reinforcement of claim 1 wherein the glass fibers are in the form of a strand.

3. The high strength reinforcement of claim 1 wherein the glass fibers are in the form of a roving.

4. A multi-filament strand of glass fibers consisting of 65 parts by weight silica, 25 parts alumina and 10 parts magnesia, said glass fibers having an average tensile strength in excess of 500,000 p.s.i.

5. A multi-filament strand of glass fibers consisting of 55 parts by weight silica, 32 parts alumina and 13 parts magnesia, said glass fibers having an average tensile strength in excess of 500,000 p.s.i.

6. A multi-filament strand of glass fibers consisting of 79.9 parts by weight silica, 12.6 parts alumina and 8 parts magnesia, said glass fibers having an average tensile strength in excess of 500,000 p.s.i.

7. A multi-filament strand of glass fibers consisting of 65 parts by weight silica, 31 parts alumina and 4 parts magnesia, said glass fibers having an average tensile strength in excess of 500,000 p.s.i.

8. A multi-filament strand of glass fibers consisting of 70 parts by weight silica, 25 parts alumina and 5 parts magnesia, said glass fibers having an average tensile strength in excess of 500,000 p.s.i.

References Cited

UNITED STATES PATENTS

| 3,183,104 | 5/1965 | Thomas | 106—50 |
| 3,189,471 | 6/1965 | Thomas | 106—50 |
| 3,007,806 | 11/1961 | Hartwig | 106—50 |

FOREIGN PATENTS

| 765,244 | 1/1957 | Great Britain. |

HELEN M. McCARTHY, *Primary Examiner.*